United States Patent [19]

Reisinger

[11] 4,012,589
[45] Mar. 15, 1977

[54] SWITCHING ARRANGEMENT FOR TRANSMITTING DATA IN TIME DIVISION MULTIPLEX SYSTEMS

[75] Inventor: Konrad Reisinger, Zorneding, Germany

[73] Assignee: Siemens Aktiengesellschaft, Munich, Germany

[22] Filed: Feb. 13, 1976

[21] Appl. No.: 658,120

[30] Foreign Application Priority Data

Mar. 20, 1975 Germany .......................... 2512302

[52] U.S. Cl. .............................. 178/50; 179/15 BS
[51] Int. Cl.[2] ......................................... H04J 3/06
[58] Field of Search ...................... 178/50, 69.5 R; 179/15 BS, 15 BA, 15 BV, 15 AW, 15 BY

[56] References Cited

UNITED STATES PATENTS

| 3,881,065 | 4/1975 | Queffeulou | 179/15 BA |
| 3,898,388 | 8/1975 | Goodwin | 179/15 BS |
| 3,909,540 | 9/1975 | Maryscuk et al. | 179/15 BY |

Primary Examiner—Thomas A. Robinson
Attorney, Agent, or Firm—Gerald L. Lett

[57] ABSTRACT

A switching arrangement is described for transmitting data in time division multiplex (TDM) systems on a character frame basis. The system includes a polarity reversal recognition circuit producing a polarity reversal signal and signaling polarity reversals of a data signal. A blocking circuit arrangement produces a stop signal thereby blocking the polarity reversal recognition circuit throughout the duration of a predetermined number of $m$ bits of the data signal. A clock generator produces a clock signal which facilitates the sampling of the data signal. A shift register is provided which contains no fewer than $m+2$ cells and has a set of parallel input terminals for the parallel coupling of binary digits to the shift register. Serial input terminals to the shift register provide for the serial application of binary digits to the shift register. A clock pulse input terminal to the shift register receives shift register clock pulses. A gate is provided for receiving the polarity reversal signal and the output signal of the last cell of the shift register. The output from the foregoing gate yields a phase position signal which is utilized to determine the phase position of the clock signal which is applied to the aforementioned clock pulse input terminal of the shift register. The output signal of the second to last cell of the shift register is applied as a stop signal to the polarity reversal recognition circuit. The phase position signal is coupled to two or more parallel input terminals of the shift register. The serial input terminals of the shift register receive binary digits differing from the binary digits of the phase position signal that are applied to the parallel input terminals of the shift register.

3 Claims, 5 Drawing Figures

SWITCHING ARRANGEMENT FOR TRANSMITTING DATA IN TIME DIVISION MULTIPLEX SYSTEMS

BACKGROUND OF THE INVENTION

The invention relates to a switching arrangement for transmitting data in time division multiplex (TDM) systems on a character frame basis.

During the transmission of data in TDM systems on a character frame basis the data signals produced by two or more data sources are normally applied on the send side via channel units to a send-side multiplexer, over the outlet of which a TDM signal is produced.

It is an object of the invention to provide a switching arrangement usable as a channel unit of little complexity and requiring little expense and which can be made using standardized logic elements.

SUMMARY OF THE INVENTION

In accordance with the invention, the foregoing and other objects are achieved in apparatus where there is provided a shift register comprising no fewer than $m+2$ cells and having a parallel inlet for the parallel input of binary digits, a serial inlet for the serial input of binary digits and a clock pulse inlet for the application of shift register clock pulses. A gate is provided to which are applied the polarity-reversal signal and the output signal of the $m+2^{th}$ cell of the shift register and from the outlet of which a phase-position signal is produced which is utilized for determining the phase position of the clock signal. The clock pulse signal is applied to the clock pulse inlet terminal of the shift register, and the output signal of the $m+1^{th}$ cell of the shift register is applied as a stop signal to the polarity-reversal recognition circuit. The phase-position signal is applied to two or more parallel inlets of the shift register, and there are applied to the serial inlet of the shift register binary digits that differ from the binary digits of the phase-position signal that are applied to the parallel inlets of the shift register.

The circuit arrangement according to the principles of the invention is usable as a channel unit and is characterized by little complexity and by the use of standardized logic elements. Particularly the shift register has proved highly successful, because it complies simultaneously with several functions and serves on the one hand to count the individual bits of the data signal in producing the stop signal and, on the other, exercises a logic function in determining the phase position of the clock signal used to sample the data signal.

Despite the comparatively small expenditure, with the use of the switching arrangement made in accordance with the principles of the invention a corrected data signal can be provided to the multiplexer even if a data signal applied to the channel unit has distortions up to 50%.

If within the frame of a data signal, not only teleprinter signals, but also pulsing signals, are to be transmitted for the selection of a teleprinter using dial pulse selection, it is convenient to provide a polarity recognition circuit to which the data signal is applied at the beginning and which in the absence of a stop signal produces a polarity signal that signals with its binary digit the positive or negative polarity of the data-signal polarity reversals. A second gate is provided to which are applied at the beginning the phase-position signal and the polarity signal and the outlet of which is connected to m + 2/2 parallel inlets of the shift register, while the phaseposition signal is applied to the remaining parallel inlets of the shift register.

BRIEF DESCRIPTION OF THE DRAWINGS

The principles of the invention will be more readily understood by reference to the description of a preferred embodiment give hereinbelow in conjunction with the drawings which are briefly described as follows.

DETAILED DESCRIPTION OF THE DRAWINGS

Figure 1:
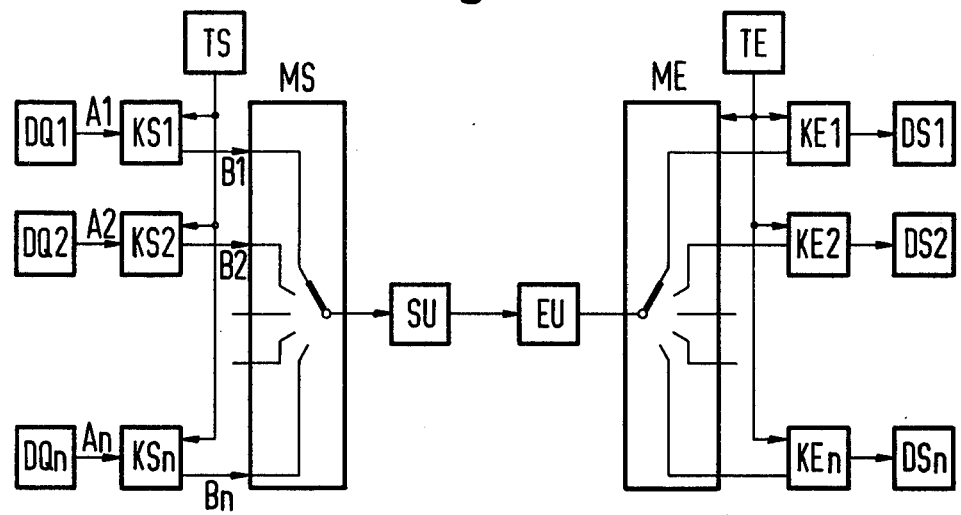
FIG. 1 is a block schematic diagram of a TDM transmission system containing the channel switch of the invention.

FIG. 1 shows on the send side the data sources DQ1, DQ2 . . . DQn, channel units KS1, KS2 . . . KSn, clock generator TS, multiplexer MS and the send-side transmission equipment SU. As data sources there may be provided teletypewriter subscribers, teletypewriter exchanges, tape readers, card readers, etc. For simplicity, only three data sources are shown, although in practice two or more such data sources may be provided.

On the receive side of the system are located receive-side transmission equipment EU, multiplexer ME, clock generator TE, bistable circuits KE1, KE2 . . . KEn and data sinks DS1, DS2 . . . DSn. As data sinks there may be provided teletypewriter subscribers, teletypewriter exchanges, tape punches, key punches, etc.

The signals A1, A2 . . . An produced by the data sources DQ1 to DQn supply in various bit frames the individual bits of the data to be transmitted. The channel units KS1 to KSn are designed to match the individual bits of the signals A1 to An to the clock pulse of the multiplexer MS in proper phase relation and, at the same time, to eliminate distortions of the individual bits. A TDM signal is provided via the outlet of multiplexer MS to the send-side transmission equipment SU and transmitted from there to the receive-side transmission equipment EU and to the receive-side multiplexer ME.

Figure 2:
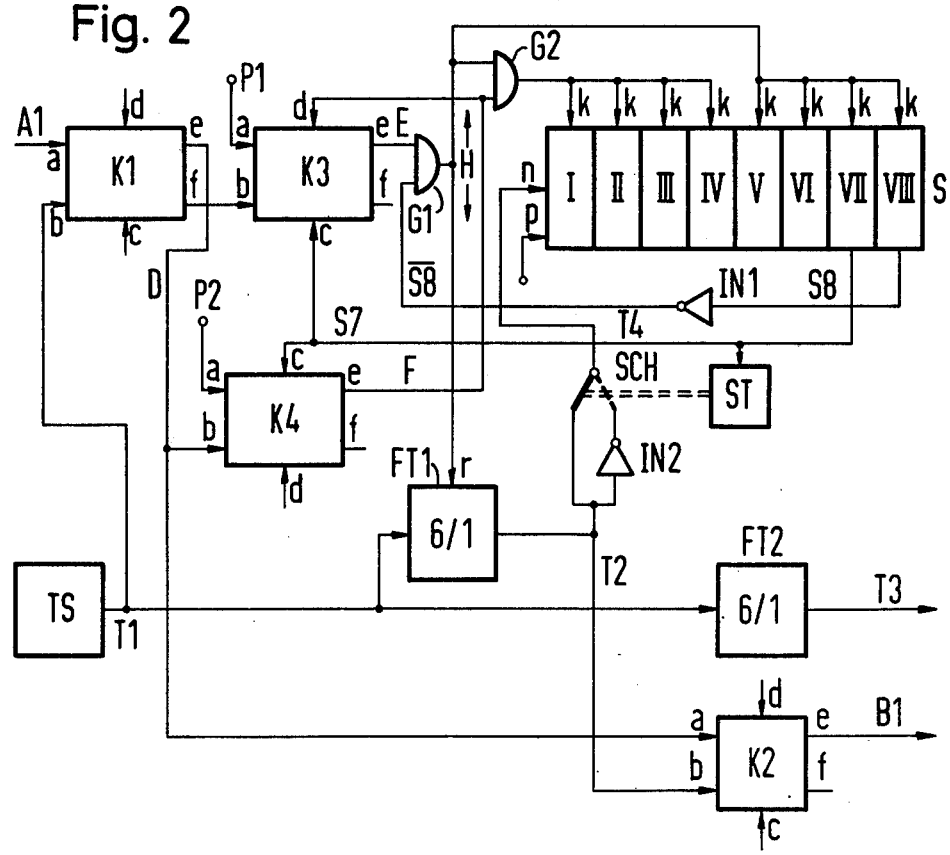
FIG. 2 is a schematic diagram providing details of a preferred embodiment of the channel switch shown schematically in FIG. 1.

FIG. 2 shows an exemplary embodiment of one of the channel units KS1, KS2 . . . KSn shown schematically in FIG. 1 and also in schematic diagram the clock generator TS. Bistable circuits K1, K2, K3, K4 each have inlets $a$, $b$, $c$, $d$ and outlets $e$, $f$. The bistable circuits assume two stable conditions and produce throughout the duration of their zero conditions zero signals via outlets $e$ and one signals via outlets $f$. Throughout the duration of the one conditions, the bistable circuits produce via outlets $e$ a one signal and via outlets $f$ a zero signal. A transition from the zero condition to the one condition occurs whenever a one signal is applied at inlet $a$, a zero signal is applied at inlets $c$ and $d$, and if a positive pulse edge appears at inlet $b$. A transition from the one condition to the zero condition occurs whenever zero signals are applied at inlets $a$, $c$ and $d$ and likewise whenever a positive pulse edge appears at inlet $b$. If a one signal is applied at inlet $c$ and a zero signal at inlet $d$, the bistable circuits remain in their one condition. If a zero signal is applied at inlet c and a one signal at inlet $d$, the bistable circuits remain in their one conditions and are not influenced by signals at inlets a and b.

Shift registers S has eight cells I, II, III, IV, V, VI, VII, VIII. Binary digits may be input in parallel fashion into the shift registers via inlets k. A continuous zero signal is applied at inlet p by which cell I may be set to the zero condition. Shift register clock pulses are applied via inlet n by which the data stored in the cells are routed onward step by step. Signals S7 and S8 are provided via outlets of cells VII or VIII, respectively. Control circuit ST governs the switch SCH which in the case of signal S7=1 assumes the operating position shown by the solid line and in the case of signal S7=0 by the dotted line. Inverters IN1 and IN2 cause an inversion of the signal applied thereto. Clock signal T1 of clock generator TS is applied to frequency divider FT1, causing a frequency division in the ratio 6 to 1 and yielding signal T2. If signal H=1 is applied via inlet r of frequency divider FT1, the latter starts counting. In this way the phase position of clock signal T2 can be set with the aid of signal H=1. Frequency divider FT2 likewise receives the clock signal and likewise causes a frequency division in the ratio 6 to 1, producing clock signal T3, the phase position of which cannot be set and by which the multiplexer MS of FIG. 1 is clocked.

Figure 3:
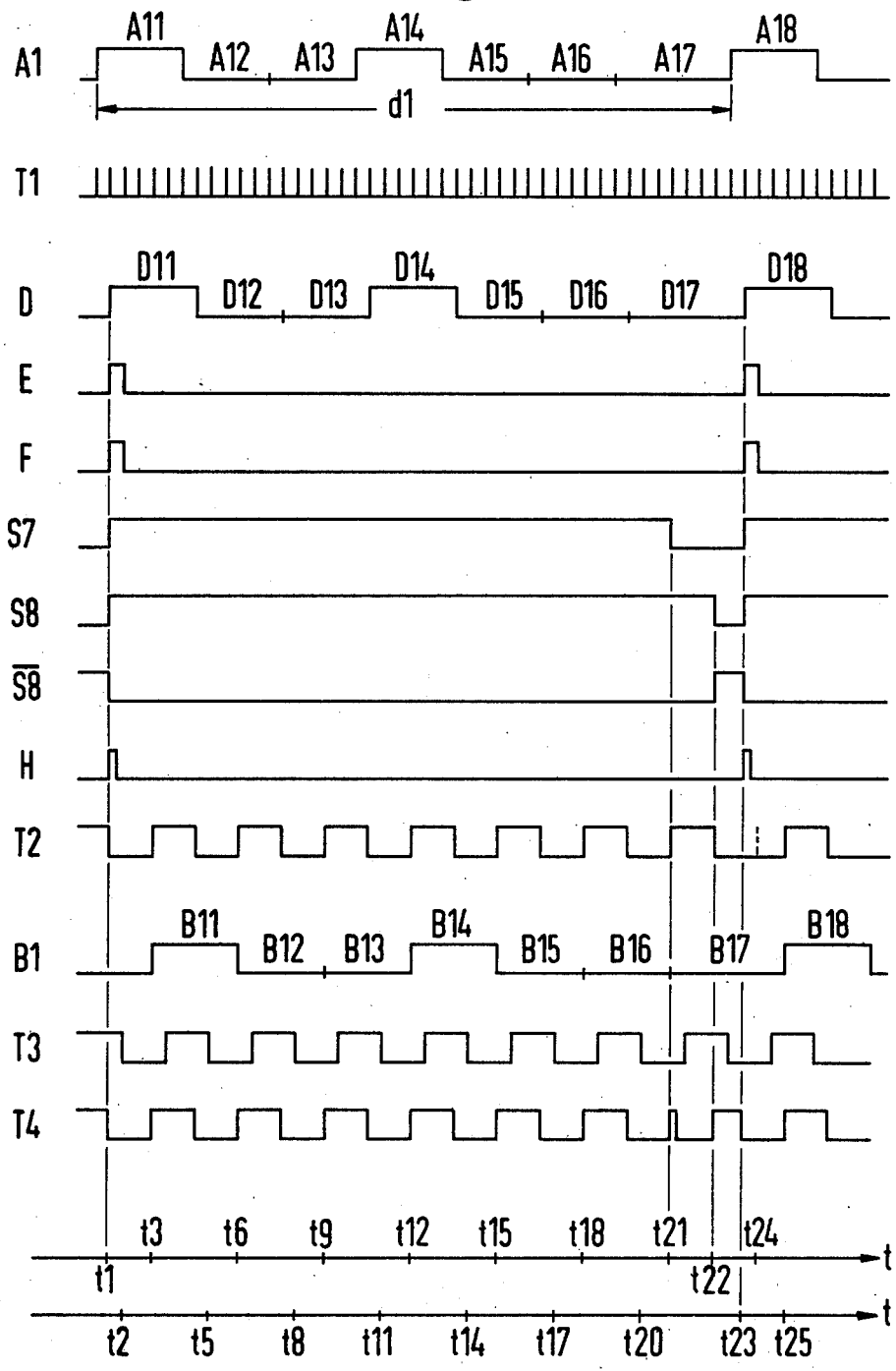
FIGS. 3, 4 and 5 are time-waveform diagrams showing signals occurring during the operation of the system illustrated in FIG. 1.
Figure 4:
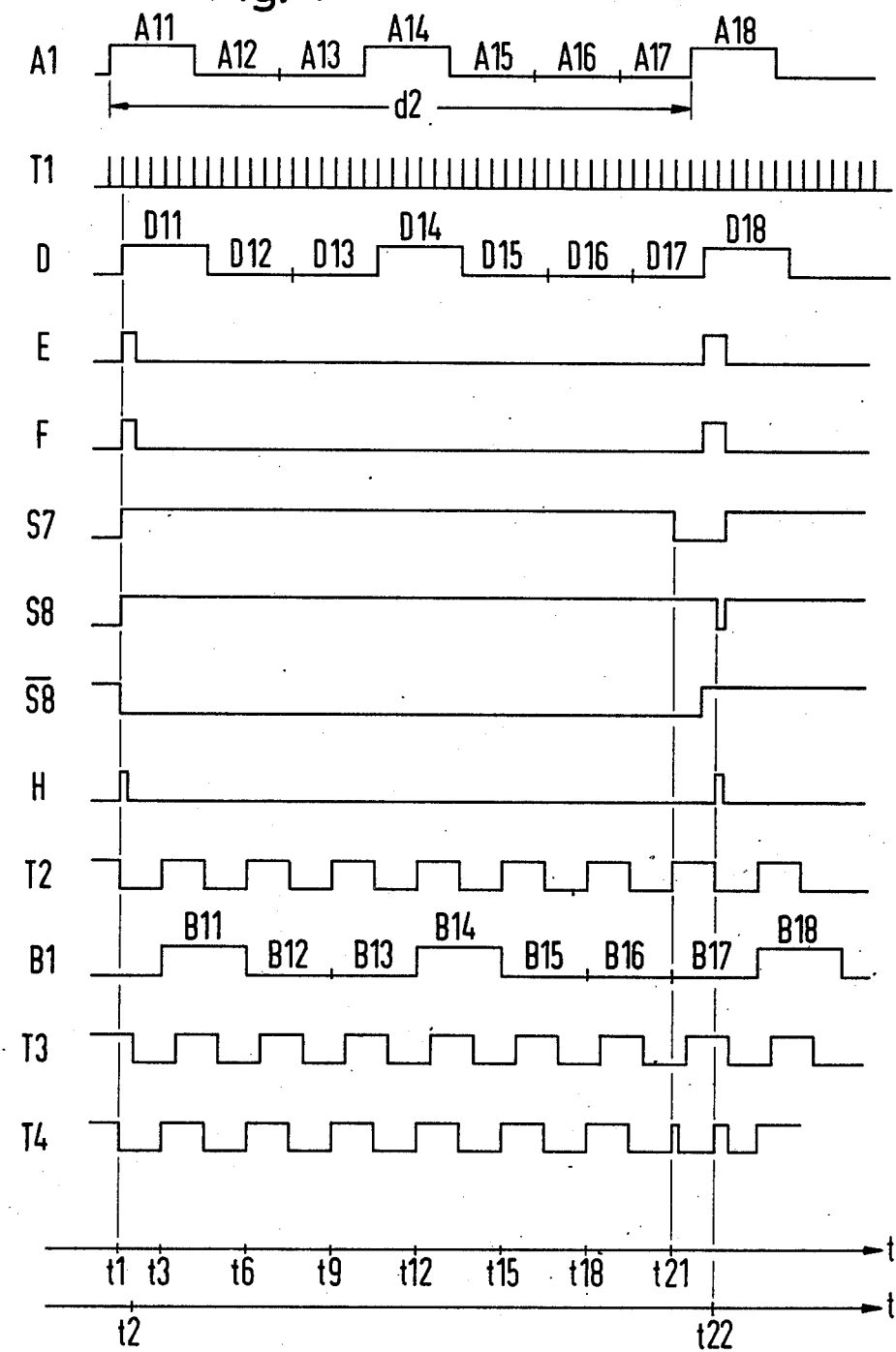
Figure 5:
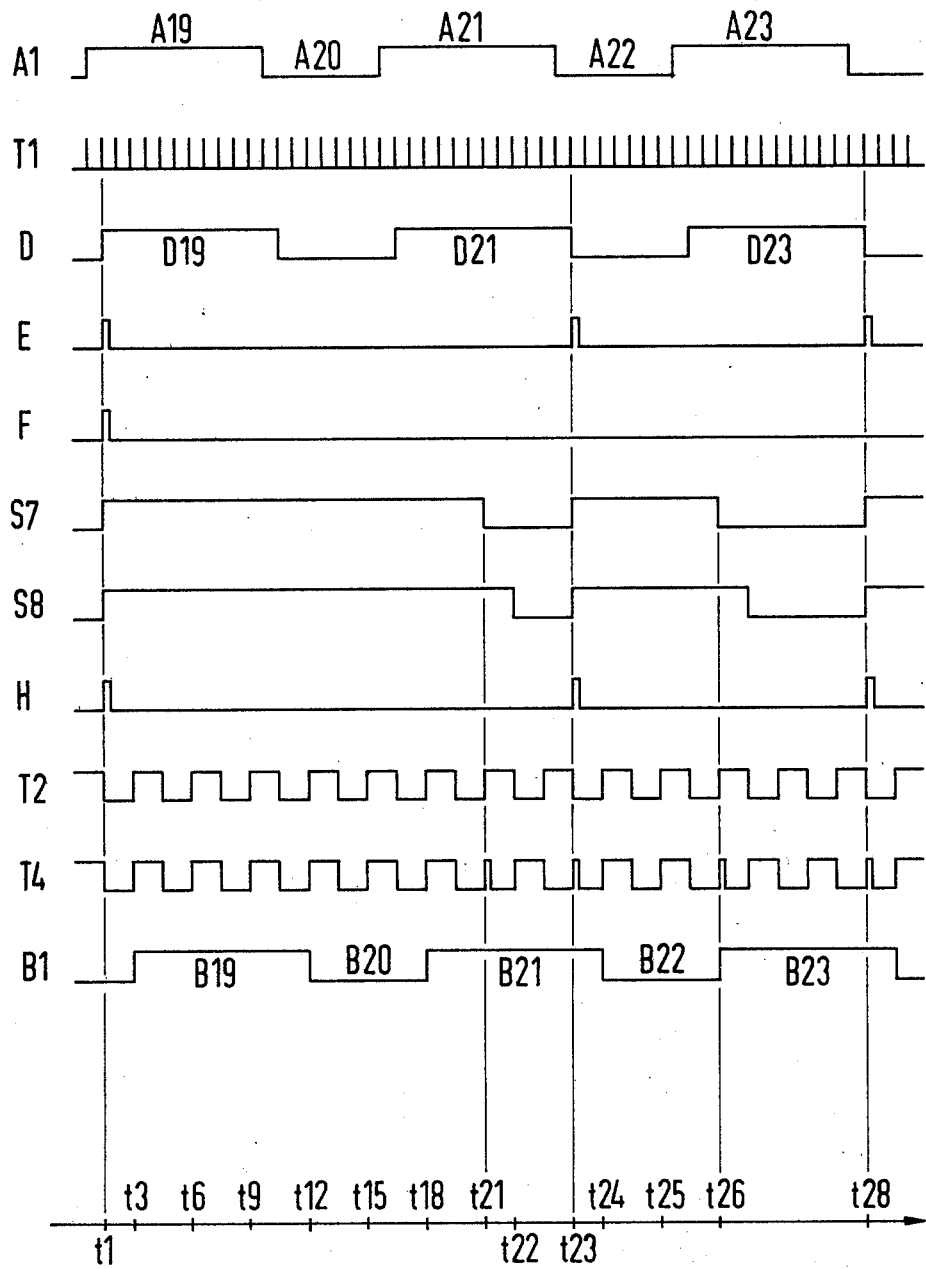

FIGS. 3, 4 and 5 show signals applied during the operation of the system of FIG. 1 and during the operation of the channel unit of FIG. 2. The axis of abscissas refers to the time t. At the beginning, signal A1 is applied to the channel unit and may comprise two or more bits A11 to A18. With bit A11 at start pulse, bits A12, A13, A14, A15, A16 as information bits and bit A17 as stop pulse, a first signal is transmitted throughout the duration d1. Bit A18 is the start pulse of the next signal. In this case, it is assumed that stop pulse A17 is substantially longer than the remaining bits A11 to A16.

For simplicity, the clock signal T1 produced by clock generator TS is shown only with six pulses per bit period, whereas in practice a greater number of pulses per bit period are generated. The division ratios of frequency dividers FT1 and FT2 are adapted to the number of pulses per bit. If a number m of pulses of clock signal T1 are applied throughout the duration of a bit, the division ratio of frequency dividers FT1 and FT2 is m to 1.

Bistable circuit K1 is operated in the clock pulse of signal T1, so that signal D is provided via its inlet e and the individual bits thereof (D11 to D17) are slightly delayed in relation to bits A11 to A17. A zero signal is stored in cell VII prior to time slot t1 and bistable circuit K4 is in the zero condition so that with S7=0 and with F=0 the bistable circuits K3 and K4 can be switched prior to time slot t1. Continuous one signals are applied via switching points P1 and P2. Under these conditions, signal F=1 is produced with signal D=1 at time slot t1 via outlet e of bistable circuit K4, said signal F=1 being applied via inlet d to bistable circuit Ke and producing signal E=1.

It is also assumed that signal S8=0 is emitted from cell VIII prior to time slot t1, so that gate G1 is opened with signals S8=1 and E=1 and signal H=1 is produced.

Signal F signals polarity reversals of signals A1 and D. Particularly, a positive pulse edge is signaled with signal F=1 and a negative pulse edge is signaled with signal F=0. Commencing with time slot t1 a positive pulse edge of signal D is signaled with signal F=1 and gate 2 is briefly opened with signals H=1 and F=1, and one signals are read into cells I, II, III, IV via the outlet of gate G2. Signal H=1 is likewise applied to inlets k of cells V to VIII so that signal S7=1 is emitted from cell VII, causing bistable circuits K3 and K4 to be reset to their zero conditions at time slot t2. With the positive pulse edge of signal E occurring at time slot t1 the simultaneously occurring pulse edge of signal D is signaled.

Frequency divider FT1 is reset with signal H=1 at time slot t1 so that it starts counting again from time slot t1 and thereby establishes the phase position of signal T2. Commencing with time slot t1 the switch SCH is set with signal S7=1 to the operating position shown by the solid line with the aid of the control circuit ST so that signals T2 and T4 are equal from t1 to t21.

At time slot t2, one signals are stored in all cells I to VIII. Thereafter, zero values are read in serially via inlet p so that zero values are stored from time slot t3 on in cell I, from time slot t6 on in cells I and II, from time slot t9 on in cells I to III, from time slot t12 on in cells I to IV, from time slot t15 on in cells I to V, from time slot t18 on in cells I to VI, and from time slot t21 on in cells I to VII, and signal S7=0 is produced at time slot t21. This signal S7=0 brings about the operating position of switch SCH shown by the dotted line so that signal T4 is now inverted in relation to signal T2. Since the binary digits of cells I to VIII are always shifted with the positive pulse edges, the word 00000000 is already stored at time slot t22. If signal T4 were not inverted, the word 00000000 would not have been stored until at time slot t24. This would be too late, since signal S8=0 and signal S8=1 are needed at time slot t23 to register start pulse D18 and to produce signal H=1. At time slot t23, signals E=1, F=1, H=1 are produced with the positive edge of signal D similarly as at time slot t1. The phase position of signal T2 is again established with signal H=1.

Signal T2 is applied as a clock signal to bistable circuit K2 so that signal D is transferred at the time slots of the positive pulse edges, i.e., at time slots t3, t6, t9, t12, t15, t18, t21, t25, and signal B1 is applied to multiplexer MS of FIG. 1 via the outlet of the channel unit. Thus, the leading edge of start pulse D11 occurring at time slot t1 is detected with the channel unit described above, and a total of six sampling time slots are established with signal T2 at time slots t3, t6, t9, t12, t15, t18, located in the middle of bit intervals D11, D12, D13, D14, D15, D16, if these bits are not distorted. Even with distortions up to about 48%, these bits D11 to D16 are still sampled correctly and the undistorted bits B11 to B16 of signal B are produced. Thus, signal B is characterized in that its bits B11 to B16 are equally long and undistorted. The longer stop pulses A17, D17 are transferred in equal lengths to signal B17 followed immediately by start pulse B18 of the next signal.

Signal components of signal B1 are transferred within the multiplexer MS of FIG. 1 with the positive edges of signal T3 and emitted via the outlet of the multiplexer in the frame of a TDM signal not shown. It is apparent that bits B11 to B16 are sampled exactly once, whereas bit B17 is sampled twice, similar to stop pulse.

FIG. 4 shows a signal A which, in contrast to signal A1 of FIG. 3, has an extremely reduced stop pulse A17. For example, the duration of stop pulse A17 may be reduced to 70% of the duration of the remaining bits A11 to A16. The channel unit of FIG. 2 is designed to produce in this case also a stop pulse B17 having at least the same length as the remaining bits B11 to B16. As described hereinabove, signal H=1 is produced at time slot t1, and the phase of signal T2 is set as a function of the leading edge of bit D11. As described earlier, signal S7=0 is likewise produced at time slot t21, thereby preparing the setting of bistable circuits K3, K4 to their one conditions. At time slot t21, switch SCH is again placed in the operating position shown by the dotted line, so that signals T2 and T4 are different from time slot t21 on. At time slot t22, signal S8=0 is produced with the positive edge of signal T4 at a later period than the leading edge of start pulse D18. This produces stop pulse B17, which is longer than stop pulse D17.

It has heretofore been assumed with reference to FIGS. 3 and 4 that telegraph signals are transmitted as signal A comprising start pulses, information unit elements and stop pulses. However, in many cases one must expect that also pulsing signals are transmitted produced by means of a dial switch not shown and which serves to select one of a number of teleprinters.

FIG. 5 refers to the case where a pulsing signal is transmitted as signal A1, whose pulses A19, A21, A23 have a duration of about 60 ms and whose no-current periods A20, A22 are about 40 ms. The channel unit of FIG. 2 is designed to correct such pulsing signals. Under these conditions, the signal D of FIG. 5 largely resembles the signal A shown therein. At time slot t1, a positive edge of pulse D19 occurs which interprets the channel unit as a positive edge of a start pulse and subsequently, as described in FIGS. 3 and 4, produces signal H=1, thereby establishing the phase position of signal T2. At time slot t21, signal S7=0 is again produced, and bistable circuits K3 and K4 are thus again prepared to assume their one conditions, if necessary. Also, the operating position of switch SCH as shown by the dotted line is set with signal S7=0, so that the polarity of signal T4 applied at inlet n differs from that of signal T2 from time slot t21 to time slot t23.

At time slot t23 a pulse edge of signal D is signaled with signal E=1. This time, however, in contrast with the cases referred to in FIGS. 3 and 4, not the positive but the negative pulse edge of pulse D21 is used. In this way, signal H=1 is again produced and the phase position of signal T2 is again established. However, at time slot t23 not signal F=1 is produced, as heretofore, but signal F=0. In this way the negative pulse edge of pulse D21 is signaled. Thus, gate G2 is not opened, and a zero signal is emitted to cells I to IV via the inlet, so that shortly after time slot t23 the word 00001111 is stored in shift register S. At time slot t24, the zero of cell IV reaches cell V, at time slot t25 cell VII and at time slot t26 cell VII, so that from this time slot on bistable circuits K3 and K4 are again conditioned with signal S7=0 to assume their one conditions, if necessary.

At time slot t28, the negative pulse edge of pulse D23 is signaled with signal E=1 and subsequently signal H=1 is produced, which again establishes the phase position of signal T2. Also, at time slot t28, it is signaled with signal F=0 that the pulse edge of pulse D23 is negative so that again a zero value is read into cells I to IV.

As heretofore, signal T2 is again utilized to synchronize bistable circuit K2 so that undistorted pulses B19 to B23 are obtained from distorted pulses D19 to D23 and applied to multiplexer MS of FIG. 1.

The principles of the invention are described hereinabove in terms of a preferred and exemplary embodiment. It is contemplated that the construction and operation of the described embodiment can be modified or changed in a variety of ways obvious to those skilled in the art, as defined by the appended claims.

I claim:

1. A switching arrangement for the transmission of data in a time division multiplex (TDM) system on a character frame basis, which system includes a polarity reversal recognition circuit producing a polarity reversal signal and signaling polarity reversals of a data signal, a blocking circuit arrangement producing a stop signal blocking the polarity reversal recognition circuit throughout the duration of a predetermined number of m bits of the data signal and a clock generator producing a clock signal facilitating the sampling of the data signal, the switching arrangement comprising:
    shift register means comprising at least a number m+2 cells and including parallel input terminals for receiving binary digits in parallel, serial input terminals for receiving binary digits in series and a clock pulse input terminal for receiving shift register clock pulses,
    gate means having an input connected to receive said polarity reversal signal and another input connected to receive the output signal from the m + 2$^{th}$ cell of said shift register means and having an output terminal for emitting a phase position signal,
    means for adjusting the phase position of said clock signal responsive to said phase position signal, said adjusted clock signal being coupled to said clock pulse input of said shift register means,
    the m + 1$^{th}$ cell of said shift register means being connected to said polarity reversal recognition circuit to provide a stop signal for that circuit,
    said phase position signal being coupled to at least two parallel input terminals of said shift register means and
    means for applying to said serial input terminals of said shift register means binary digits differing from the binary digits of said phase position signal.

2. The switching arrangement defined in claim 1 further comprising:
    polarity mode recognition circuit means having input terminals for receiving the data signal and for producing in the absence of a stop signal a polarity signal indicating the positive or negative polarity of the data signal polarity reversals,
    second gate means having an input connected to receive said phase position signal and another input connected to receive said polarity signal and an output connected to the m + 2/2 parallel input terminals of said shift register means,
    said phase position signal being connected to the remaining parallel input terminals of said shift register means.

3. The switching arrangement defined in claim 1 further comprising:
    switch means,
    control circuit means for controlling said switch means as a function of a control signal,
    said switch means connecting, after a first binary digit of said control signal, a center contact with a first contact and after a second binary digit of the control signal connecting the center contact with a second contact, said center contact of said switch being connected to said clock pulse input terminal of said shift register means, said adjusted clock pulse signal being applied to said first contact of said switch means and an inverted clock pulse signal being applied to said second contact of said switch means.

* * * * *